May 12, 1970  B. EDWARDS  3,510,913
DEEP DRAWN ARTICLE FORMING APPARATUS
Filed June 8, 1966  2 Sheets-Sheet 1

INVENTOR.
Bryant Edwards
BY
His Att'ys

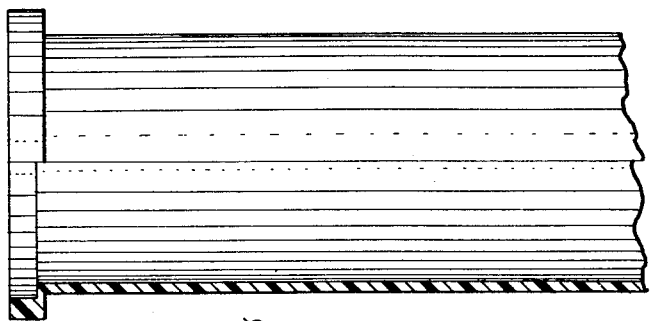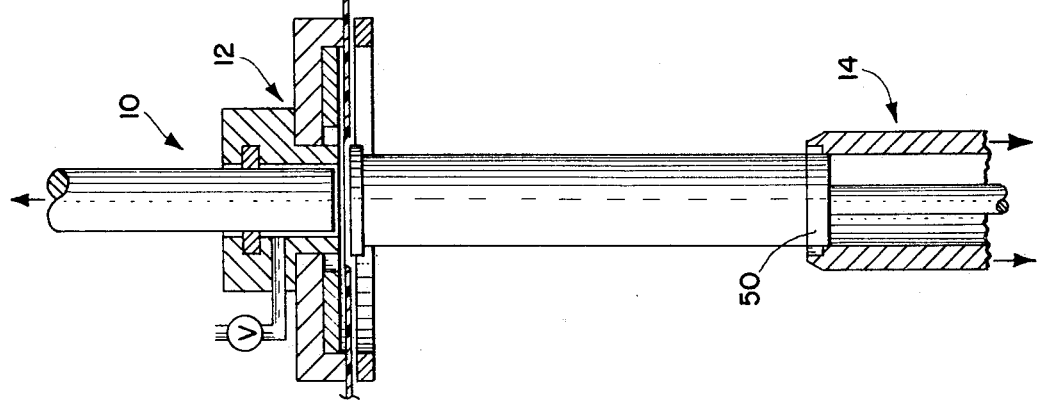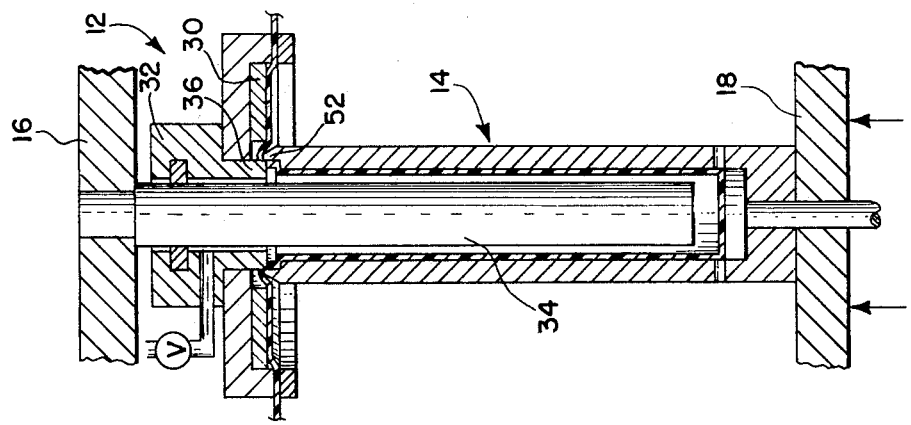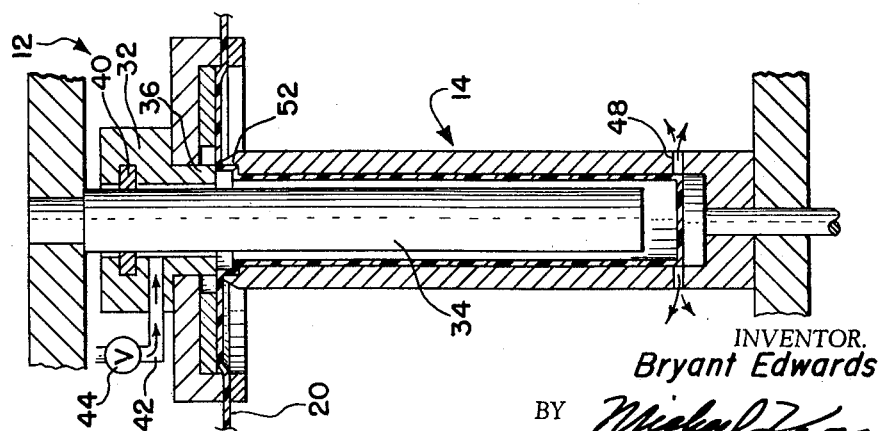

United States Patent Office 3,510,913
Patented May 12, 1970

3,510,913
DEEP DRAWN ARTICLE FORMING APPARATUS
Bryant Edwards, Clarendon Hills, Ill., assignor to Illinois Tool Works Inc., Chicago, Ill., a corporation of Delaware
Filed June 8, 1966, Ser. No. 556,083
Int. Cl. B29c 17/04
U.S. Cl. 18—19                    3 Claims

ABSTRACT OF THE DISCLOSURE

Apparatus for manufacturing deep drawn articles of thin-wall thermoplastic construction to provide a substantially uniform wall thickness throughout all wall portions thereof through the use of mold members which control material distribution from the inception to the completion of the forming cycle.

---

It is well known to manufacture thin-wall thermoplastic container articles in the neighborhood of .002–.035 inch in thickness by sheet formed molding techniques including mechanically drawing containers from heated thermoplastic sheet material, the use of vacuum or pressure techniques without any mechanical engagement with the thermoplastic material, or a combination of mechanical engagement and pressure differential generally referred to as the "plug assist" technique. Where containers have been formed according to these techniques, it has been found that the deeper the draw that is encountered, the more possibility for variations in wall thickness uniformity. While axial height of containers has been limited primarily by undue thinning of the material as it is being drawn from the thermoplastic web, there have been other factors restricting deep drawing of the material such as prematuring or undesired engagement with non-heated sections of mold members and slippage of the material along various mold components as it is being formed. Accordingly, the distribution of the material during the forming of drawn or thermoformed container articles is the crucial factor in determining the axial height or depth of the ultimate container article that can be formed.

It is one object of the present invention to provide apparatus for improving the material distribution in thin-walled containers.

More specifically, it is an object of the present invention to provide apparatus for forming deep drawn containers without excessive thinned or thickened sections in any area of the containers.

Another object of the present invention is the provision of apparatus for substantially uniformly stretching a predetermined area of a heated thermoplastic sheet to stop slippage of material on or premature contact with mold components enabling the formation of relatively deep drawn container articles.

A further object of the present invention is the provision of apparatus which is readily adapted to present thermoforming techniques without extensive variation in the procedure, cycle time or in the tooling that is required.

These and other objects and advantages of the present invention are attained by causing substantially uniform stretching of heated thermoplastic material as it is being formed into a desired shape through control of material distribution from the inception to the completion of the forming cycle.

Reference is now made to the accompanying drawings wherein:

FIG. 5 is also a similar view to those previously described, but showing a subsequent stage of the forming cycle wherein the container article is formed to its final shape through the use of differential fluid pressure;

FIG. 6 is a similar view to FIGS. 1–5 depicting the separation of the formed article from the remainder of the sheet;

FIG. 7 is a view similar to those previously described illustrating the ejection or removal of the formed article from the mold components; and FIG. 8 is an enlarged fragmentary elevational view, partly in section, showing the ultimate container article.

Figure 1:
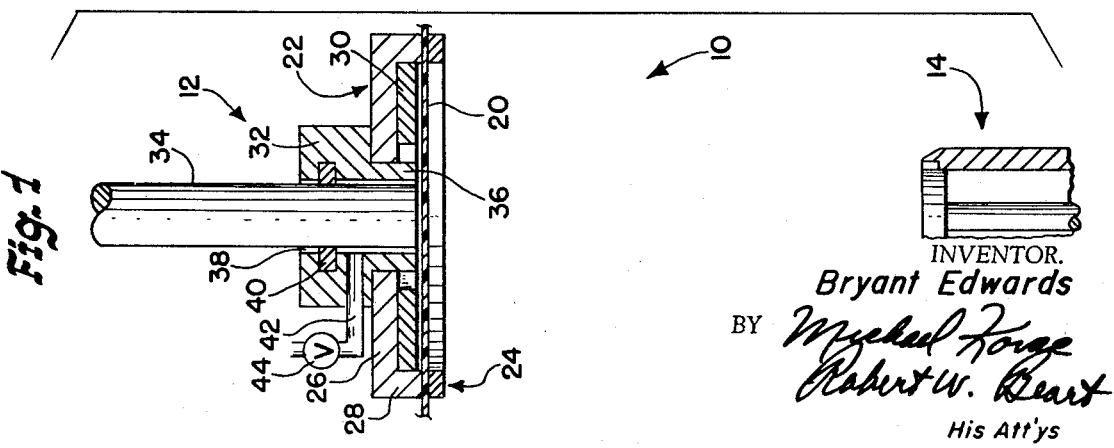
FIG. 1 is a fragmentary side elevational view, partly in section, of the apparatus constructed in accordance with the principles of the present invention just prior to deformation of thermoplastic web stock.

Referring now in greater detail to the drawings, it will be understood that the apparatus shown in FIGS. 1–7 of the drawings relates to the forming station only in a thermoforming machine. Conventional thermoforming equipment includes feeding means for advancing a web of thermoplastic material from a supply roll past a heating station which will heat the web to its forming temperature, and then to the forming station generally identified by reference numeral 10 in FIGS. 1–7 of the drawings. At the forming station, suitable means are employed for reciprocating the various mold components of the apparatus which will be described hereinafter, an example of such reciprocating means being shown in my prior U.S. Pat. No. 3,234,310 dated Feb. 8, 1966.

The underlying aspects which form the basis for the present invention are particularly suited for use with the "plug assist" technique, including a combination of mechanical engagement and differential fluid pressure, and this should be borne in mind in the discussion that is to follow.

The forming station or apparatus 10 comprises an upper mold means in the form of a male plunger or mandrel 12, and a lower mold means or female mold 14. The mandrel 12 is supported from an upper frame or manifold 16 while the lower mold means or female mold 14 is supported by the lower frame or platen 18, each of the upper and lower frames or platens being connected to suitable mechanisms for advancing and retracting the respective parts connected thereto. Such mechanisms are well known in the art, and may comprise cam mechanisms, hydraulic mechanisms or other suitable structure for advancing and retracting the parts as will be discussed hereafter.

The mandrel 12 and female mold 14 are positioned on opposite sides of a heated web of thermoplastic material 20 which is intermittently advanced in timed relationship with the advance and withdrawal of the mold components. The thermoplastic web 20, which as noted above has been previously heated by suitable heating means to its forming temperature, is first clamped in place by upper and lower annular clamping rings 22, 24 respectively which clamp the thermoplastic web in a circumferential manner about the peripheries of the mandrel 12 and female mold 14 as seen in FIG. 1 of the drawings. The clamping rings are operative immediately after an advance of new material bringing the upper and lower mold means, and are either directly or indirectly advanced and withdrawn from engagement with the thermoplastic web by the upper and lower platens 16, 18. In the case of the lower clamping ring 24, it is directly supported by the lower platen 18 while the upper clamping ring 22 is attached to one of the elements of the mandrel 12, as will be described hereafter, for actuation and withdrawal thereby.

The upper clamping ring 22 includes a top wall 26 and a peripherally extending, depending skirt portion 28, the latter cooperating with the lower clamping ring 24 and clamping off a predetermined area of the thermoplastic web 20. The top wall or plate 26 is fixedly attached to first mandrel mold portion 32 in any suitable manner to establish a sealed relationship between the depending skirt 28 of the clamping ring 22 and the elements of the mandrel 12 for purposes which will appear hereafter. The upper clamping ring 22 carries, within the confines of the depending skirt 28, an annular insert 30 which can be either a heat insulatable low friction material such as "Teflon," or a heated metal insert. The insert 30 is useful in improving the material distribution of the clamped area of the thermoplastic web as it is drawn as will be explained in detail hereafter.

Figure 2:
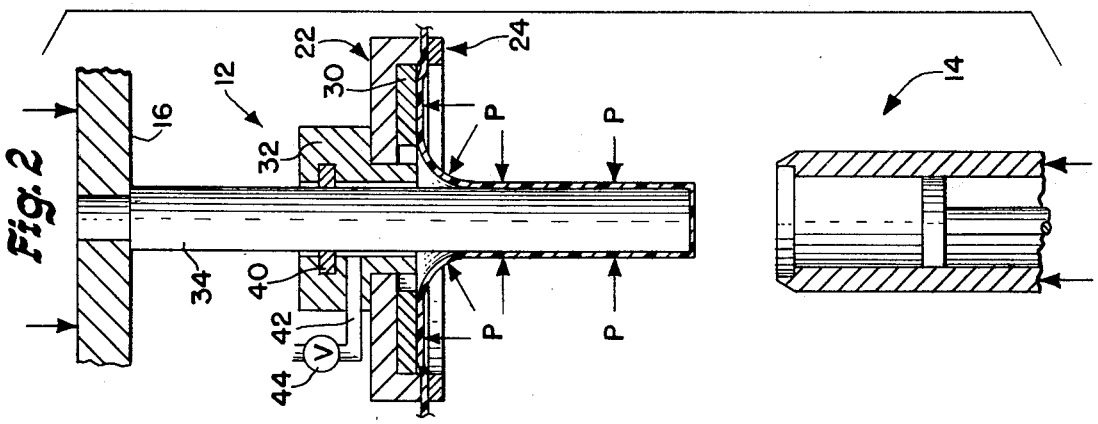
FIG. 2 is a view similar to FIG. 1 showing the relative movement and position of various mold members constituting the apparatus of the present invention preparing initial deformation of the thermoplastic sheet stock material.

The mandrel or plunger apparatus 12 includes a first mold portion 32, and an elongated plunger 34, the latter being attached to the upper platen 16 as shown, for example, in FIG. 2. The first mold portion 32 is fixedly connected to the upper clamp ring 22 and is movable along therewith by suitable supporting structure (not shown). The first mold portion 32 includes an annular neck section 36 which is received within a complementary aperture or opening formed in the top wall 26 of the upper clamping ring 22. Part of the first mold portions 32 overlies the top wall 26 as illustrated, and the parts are attached or otherwise secured to one another by any suitable fastening means.

First mold portion 32 includes a through bore or passageway 38 having a predetermined transverse dimension exceeding that of the plunger 34 to permit the first mold portion 32 and the mandrel or second mold portion 34 to be spaced from one another as shown. To provide this desired spacing as well as establish a sealed relationship between the first and second mold portions 32, 34 of the mandrel 12, a first mold portion is provided with an O-ring 40 positioned within a recess opening into the bore or passageway 38. The O-ring 40 should be of sufficient size to project beyond the confines of the recess formed in the first mold portion 32 into the bore or passageway 38 for contact with the peripheral wall surface of the plunger 34. The O-ring 40 is designed to seal the first and second mold portions 32, 34 from each other as well as space such portions a predetermined distance from each other. The spacing of the first and second mold portions 32, 34 from each other is particularly important in the "plug assist" technique described herein for admitting air to a pre-stretched article at one stage of the forming cycle. To admit air between the first and second mold portions 32, 34, an air channel 42 is provided in the first mold means 32 beneath the location of the O-ring 40 for communication with the remaining space of the bore or passageway 38 not taken up by the plunger 34. A suitable valving arrangement 44 is connected to the air channel 42 for the admission of air between the first and second mold portions 32, 34 respectively at a preselected time during the forming cycle as will be discussed in detail in the discussion that will follow.

The method and apparatus of the present invention has been conceived primarily with a view toward the manufacture of deep drawn container articles of thin-wall thermoplastic nature. In the past, undue thinning of the material, premature contact with non-heated portions of mold components and material slippage has limited the axial height or depth of container articles. The present invention overcomes these disadvantages while at the same time allowing a relatively deep drawn container article to be formed.

More specifically, it will be seen that after clamping rings 22, 24 clamp a predetermined area of the thermoplastic web 20 which has previously been heated as shown in FIG. 1, the upper platen 16 carrying with it the plunger 34 is reciprocated in the manner shown in FIG. 2 enabling the plunger 34 to mechanically pre-stretch the clamped area of the web. Since the clamped area of the sheet on the upper side thereof and the upper mold means 12 are sealed off from the remainder of the sheet, the downward movement of the plunger 34 in mechanically pre-stretching the clamped area of the sheet will cause a pressure drop in the space between the clampd area of the sheet on the upper side thereof and the O-ring seal. (At this time of the forming cycle, the valving arrangement 44 is closed to seal off the air channel 42 to eliminate any porting to the outside atmosphere.) The pressure drop between the clamped area of the sheet on the upper side thereof and the O-ring seal 40 will, in turn, cause atmospheric pressure P indicated by the arrows in FIG. 2 of the drawing to force the clamped area of the sheet against the plunger 34 and the insert 30. As can be readily seen in FIG. 2 of the drawings, this will cause the area of the pre-stretched sheet in the vicinity of the plunger 34 to cling or closely conform thereto in non-shifting relationship to avoid material slippage during the mechanical drawing phase of the forming cycle. As the plunger 34 continues to advance from the position shown in FIG. 2 to that in FIG. 3 the clamped area of the sheet will be pulled or drawn across the insert 30, and by virtue of its being made of a heat insulatable, low friction or a heated metal insert, there would be little opportunity for uneven or non-uniform thinning out of each sheet in the clamped area. It has been found that the close adhering relationship of the sheet to the plunger 34 and the insert 30 will result in substantially uniform thinning out or stretching of the material within the clamped area to enable relatively deep drawn container articles to be formed than has been possible by prior art methods and apparatus.

Figure 3:
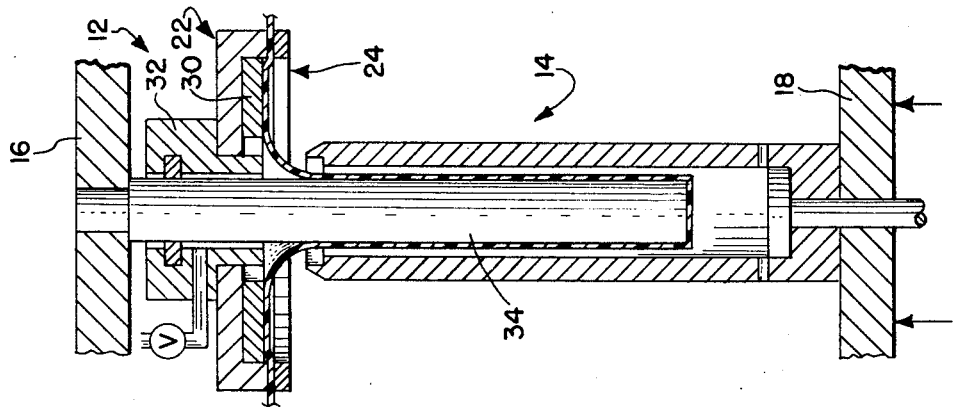
FIG. 3 is a view similar to FIGS. 1–2 with the mold component in a subsequent position of operation.
Figure 4:
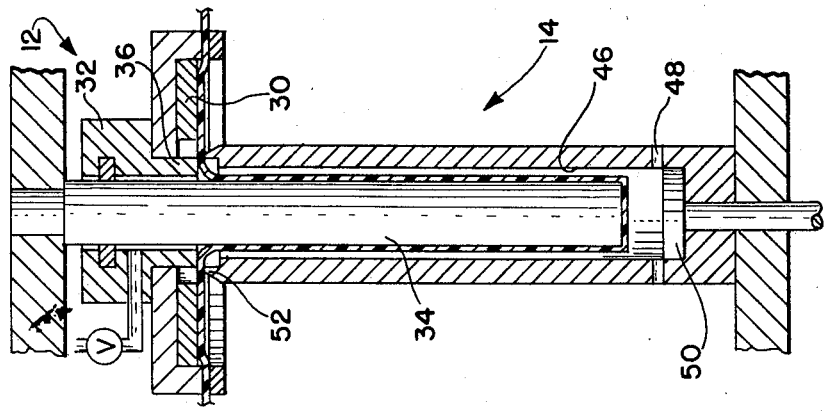
FIG. 4 is a similar view to FIGS. 1–3 with the mold components and yet another subsequent position of operation, and showing the completion of the mechanical drawings stage in the forming cycle.

While the upper platen 16 and its depending plunger element 34 are moved toward the clamped thermoplastic web 20, the lower platen and its associated female mold element 14 are simultaneously advanced corresponding increments as shown in FIGS. 1–3 until the cooperating upper and lower mold means are in the position shown in FIG. 4 of the drawings. In this position, the relative interfitting or telescoping movement of the plunger 34 and the female mold element will locate the pre-stretched or mechanically drawn areas within the confines of the female mold 14, and specifically the cavity 46 thereof. The lower end of the cavity 46 includes evacuating ports 48 to permit air between the pre-stretched material portions and the wall of the cavity to evacuate therethrough during subsequent expansion of the mechanically pre-stretched areas as will be discussed hereafter. A knock-out plunger 50 is located at the bottom of the cavity 46, the upper surface of which forms the bottom wall of the container article in its ultimate configuration, the knock-out plunger being independently operable by suitable means to eject the finally formed article from the cavity 46 of the female 14 as will subsequently appear.

The neck portion 36 of the first mold portion 32, as shown in FIG. 4, cooperates with an upstanding annular ring 52 at the open upper end of the cavity 46 to seal off the pre-formed or mechanically stretched area drawn by the plunger 34 from the remainder of the clamped area and the themoplastic sheet. In thermoforming equipment of the type illustrated, this is necessary in order to permit a differential fluid pressure to be established on opposite sides of the web within the sealed area.

The pre-formed or mechanically stretched intermediate article is sealed off from the remainder of the clamped area and the thermoplastic sheet in the manner shown in FIG. 4 of the drawings. It is then possible to establish a differential fluid pressure across the web within the sealed area. Preferably, this is accomplished, in accordance with the teachings of the present invention, by causing positive air pressure to be admitted through the air channel 42, by operating the valving arrangement at this precise instance, causing the air pressure to be move downwardly through the space between the first mold portion 32 and the second mold portion or plunger 34 and thence between the plunger and the predetermined drawn or stretched areas of the web to expand the same against the internal wall periphery of the female mold 14, this being shown in FIG. 5 of the drawings. Air in the space between the drawn material portions and the internal wall periphery of the female mold will be evacuated through the ports 48 enabling the expanded material portions to conform to the configuration of the female mold as desired.

With the container thus formed to its ultimate configuration, the next step in the forming cycle as shown in FIG. 6 of the drawings involves the severing of the finally formed article from the remainder of the thermoplastic sheet while the same is still positioned within the female mold element 14. This is accomplished by the coaction between the depending neck portion 36 of the first mold portion 32 and the upstanding annular ring 52 of the female mold element 14. The female mold element 14 is moved upwardly by the lower platen 18 causing the upstanding annular ring segment or portion 52 to be moved into the space insert 30 and the neck portion 36 for coaction with the latter and severing the formed article from the remainder of the thermoplastic sheet.

The female mold element 14 may be advanced only a short distance upwardly for causing severance of the formed article from the remainder of the web, or in the alternative, may be advanced upwardly to a point where the lower face of the neck portion 36 cooperates with a complementary abutting surface formed in the female mold element to compress the severed free end of the article therebetween to form an enlarged bead construction at the open mouth of the container as illustrated in FIG. 8 of the drawings. An enlarged bead at the open mouth of thin-wall thermoplastic containers as contemplated herein will afford axial as well as lateral strength to the container while eliminating sharp edges where the container is severed from the thermoplastic web. This particular enlarged bead formation technique is more fully set forth in my co-pending application Ser. No. 423,163, filed Jan. 4, 1965, now U.S. Pat. No. 3,418,690.

After the severance of the formed container from the thermoplastic web, the female mold element 14 is retracted while the knock-out plunger or ejector 50 remains in a fixed position to remove the completed article therefrom. Suitable air jets (not shown) are employed to remove the completed article from the forming apparatus 10. The forming cycle now repeats beginning with the clamping of the web as shown in FIG. 1 of the drawings and progressing through the various forming stages illustrated in FIGS. 2 through 7 until the completed article is removed from the forming apparatus.

It will be understood that while a single forming station is illustrated in the drawings, multiple cooperating plunger and mold elements may be employed as desired. Also, the completed container articles may be separated from the thermoplastic web and formed with an enlarged bead construction at a separate station although it has been found expedient to accomplish severing of the article (and forming of the enlarged bead) while the container is in the forming position.

In view of the foregoing description, it will be now apparent that the present invention contemplates a unique method and apparatus whereby deep drawn container articles may be formed with substantially uniform material distribution throughout entire body portions thereof. Although a specific embodiment has been shown and described, it is with full awareness that many modifications thereof are possible.

I claim:

1. Apparatus for forming deep drawn articles from a sheet of heated thermoplastic material comprising, cooperating elongated mandrel and female mold elements positioned on opposite sides of the heated sheet, clamping means also positioned on opposite sides of the heated sheet for clamping a predetermined area of the heated material in a circumferential manner outside the mandrel and mold periphery, said mandrel element including annular and cylinder-shaped relatively movable mold portions, the annular mold portion being associated in sealed relationship with the clamping means on the same side of the sheet and including a recess formed in the inner surface of the annular mold portion which receives an O-ring for engaging the cylinder-shaped mold portion in slidably mounted sealed relationship therewith, the clamping means and O-ring being axially and laterally offset from one another by an amount sufficient to define a sealed chamber therebetween when said clamping means engages said heated sheet, means for advancing the cylinder-shaped mold portion within the sealed chamber into engagement with said heated sheet for initially prestretching an intermediate article of elongated shape, the movement of the cylinder-shaped mold portion within the sealed chamber causing a pressure drop within the sealed chamber to provide clinging of the preformed intermediate article to the cylinder-shaped mold portion during its advance for consequent uniform thinning of the material, means for moving the mandrel and female mold element into interfitting relationship to position the intermediate article within the female mold element, means for sealing off the intermediate article so formed from the remainder of the sheet, and means for expanding the partially formed article within its sealed area against the inner wall periphery of the female mold element to form the ultimate article configuration.

2. The apparatus as set forth in claim 1 wherein the clamping means includes an annular circumferentially extending recess for receiving a heat insulatable, low friction material insert to avoid extraction of heat from the material during the mandrel advance and uneven stretching of the material.

3. The apparatus as set forth in claim 1 wherein the annular-shaped mold portion is spaced from the movable cylinder-shaped mold portion beneath the O-ring position and includes a check valve positioned below the O-ring for admitting positive fluid pressure to the pre-formed intermediate article for expanding the same against the inner wall periphery of the female mold element.

References Cited

UNITED STATES PATENTS

| | | |
|---|---|---|
| 2,854,694 | 10/1958 | Mumford. |
| 3,173,174 | 3/1965 | Edwards. |
| 3,338,997 | 8/1967 | Tigner _____ 264—92 X |
| 3,341,895 | 9/1967 | Shelby. |
| 3,342,914 | 9/1967 | Edwards _____ 264—92 X |
| 3,450,807 | 6/1969 | Cheney _____ 264—89 |

ROBERT F. WHITE, Primary Examiner

T. J. CARVIS, Assistant Examiner

U.S. Cl. X.R.

18—5; 264—89, 94